United States Patent
Tollefson

(10) Patent No.: US 8,376,290 B2
(45) Date of Patent: *Feb. 19, 2013

(54) INTERCONNECTING ALIGNMENT AND SUPPORT SYSTEM WITH LATCHING MECHANISM

(75) Inventor: Steve Tollefson, Mineral Wells, TX (US)

(73) Assignee: Cantex, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,925

(22) Filed: Nov. 5, 2010

(65) Prior Publication Data

US 2011/0099938 A1     May 5, 2011

Related U.S. Application Data

(63) Continuation of application No. 11/254,770, filed on Oct. 21, 2005, now Pat. No. 7,828,251.

(60) Provisional application No. 60/620,688, filed on Oct. 22, 2004.

(51) Int. Cl.
     *F16L 3/08*     (2006.01)

(52) U.S. Cl. .......... 248/68.1; 248/73; 248/49; 52/220.7; 52/220.2; 52/677

(58) Field of Classification Search ............... 52/415, 52/424, 425, 426, 427, 434, 435, 442, 677, 52/678, 682, 685, 686, 687, 688, 689, 220.1, 52/220.2, 220.7, 590.1, 590.2; 248/49, 62, 248/68.1, 73, 74.1, 74.2, 74.4, 230.1, 222.12, 248/223.41, 220.21

See application file for complete search history.

(56) References Cited

U.S. PATENT DOCUMENTS

| | | | |
|---|---|---|---|
| 2,686,643 A | 8/1954 | Bloom et al. | |
| 3,464,661 A | 9/1969 | Alesi, Jr. | |
| 3,523,667 A | 8/1970 | Guerrero | |
| 3,856,246 A | 12/1974 | Sinko | |
| 3,964,707 A | 6/1976 | Lewis | |
| 4,099,626 A * | 7/1978 | Magnussen, Jr. | 211/60.1 |
| 4,114,241 A | 9/1978 | Bisping | |
| 4,202,520 A * | 5/1980 | Loos et al. | 248/68.1 |
| 4,244,542 A | 1/1981 | Mathews | |
| 4,306,697 A | 12/1981 | Mathews | |
| 4,601,447 A | 7/1986 | McFarland | |
| 4,618,114 A | 10/1986 | McFarland | |
| 4,899,963 A | 2/1990 | Murphy | |
| 5,827,441 A | 10/1998 | Solbjörg | |
| 5,992,802 A | 11/1999 | Campbell | |

(Continued)

FOREIGN PATENT DOCUMENTS

WO    WO 8503098 A1    7/1985

*Primary Examiner* — Robert Canfield
*Assistant Examiner* — Jessie Fonseca
(74) *Attorney, Agent, or Firm* — Miles & Stockbridge P.C.; David R. Schaffer, Esq.

(57) ABSTRACT

An interconnecting alignment and support system for supporting and maintaining alignment of at least one conduit or pipe is disclosed. The system may be used, for example, during a concrete pour operation or other construction operation. The system comprises a base spacer and, optionally, one or more of an intermediate spacer and/or another base spacer. The base spacer is constructed to be capable of interlocking with another spacer on each side and the top. The intermediate spacer is constructed to be capable of interlocking with another spacer on each side and both the top and bottom. The interlocks on the spacers may be releasably latched when fully interlocked. By interlocking the spacers, a matrix structure for aligning and supporting conduit or pipe may be created. The base spacer is attachable to a surface, so that the alignment and support system may be fixed in place.

20 Claims, 6 Drawing Sheets

U.S. PATENT DOCUMENTS

| | | |
|---|---|---|
| 6,715,247 B1 | 4/2004 | Sanftleben et al. |
| 6,945,735 B1 | 9/2005 | Doverspike |
| 7,223,052 B1 | 5/2007 | Evans |
| 2006/0096197 A1 | 5/2006 | Tollefson |

\* cited by examiner

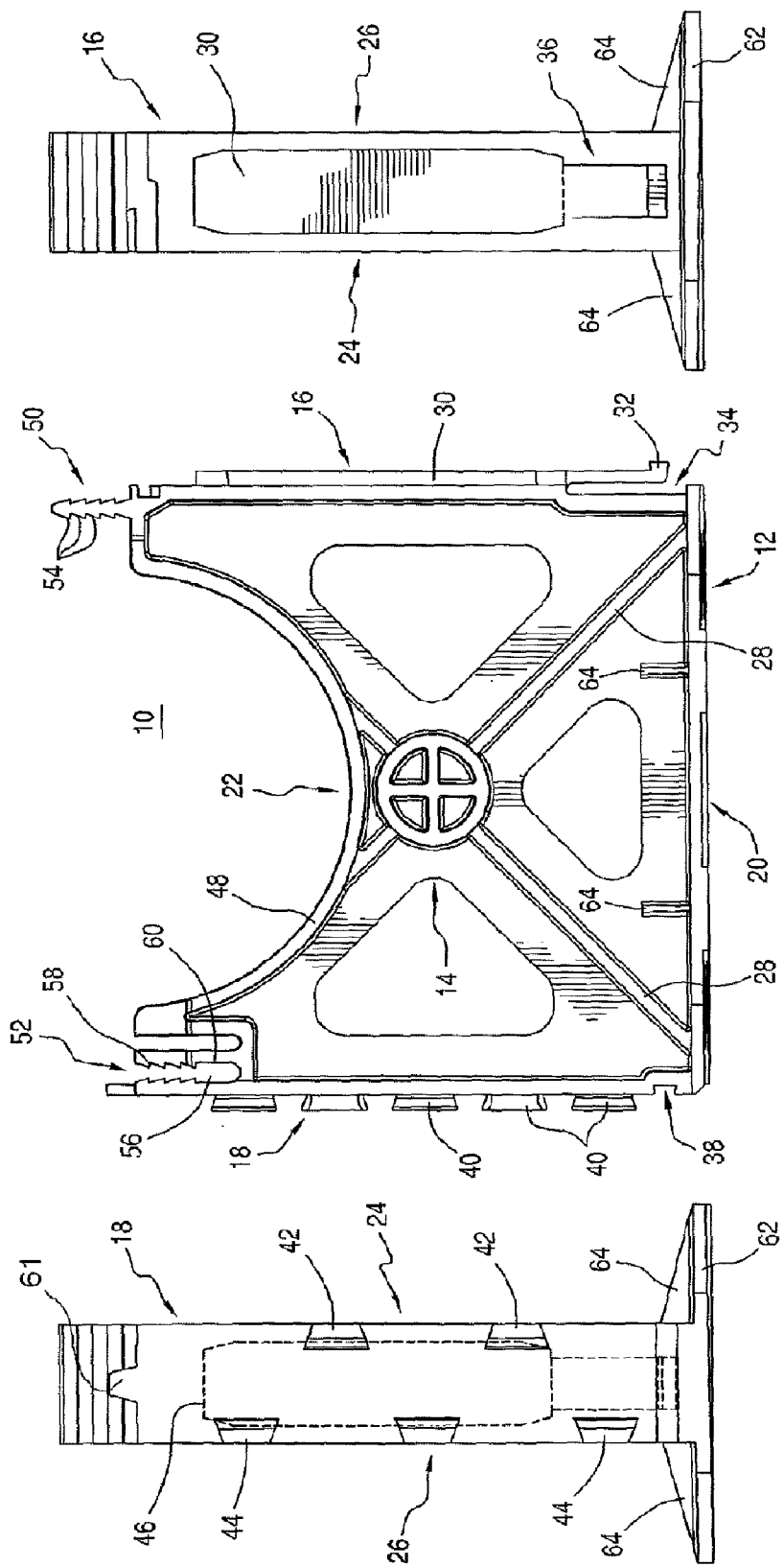

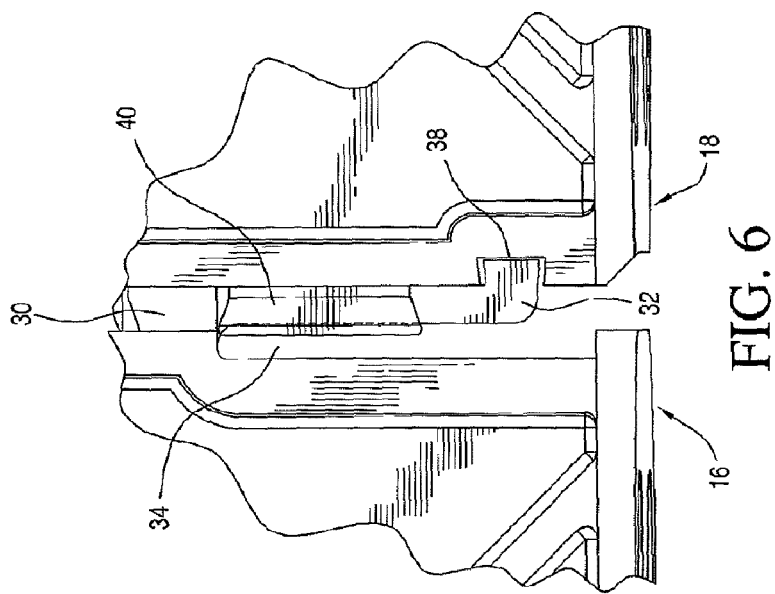
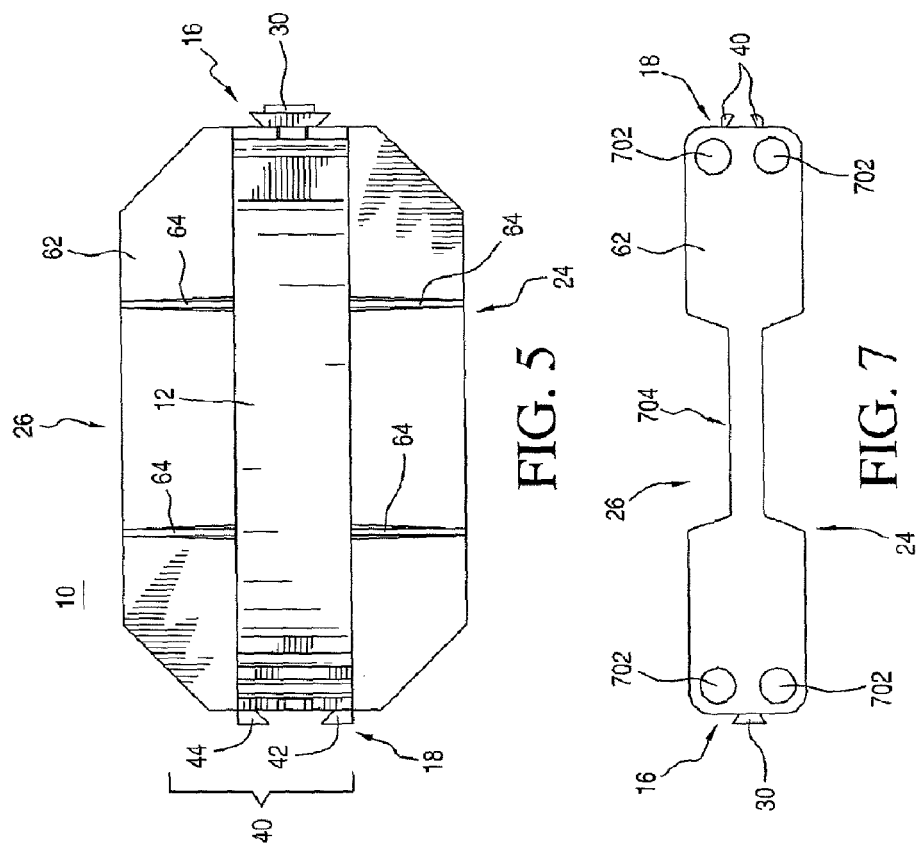

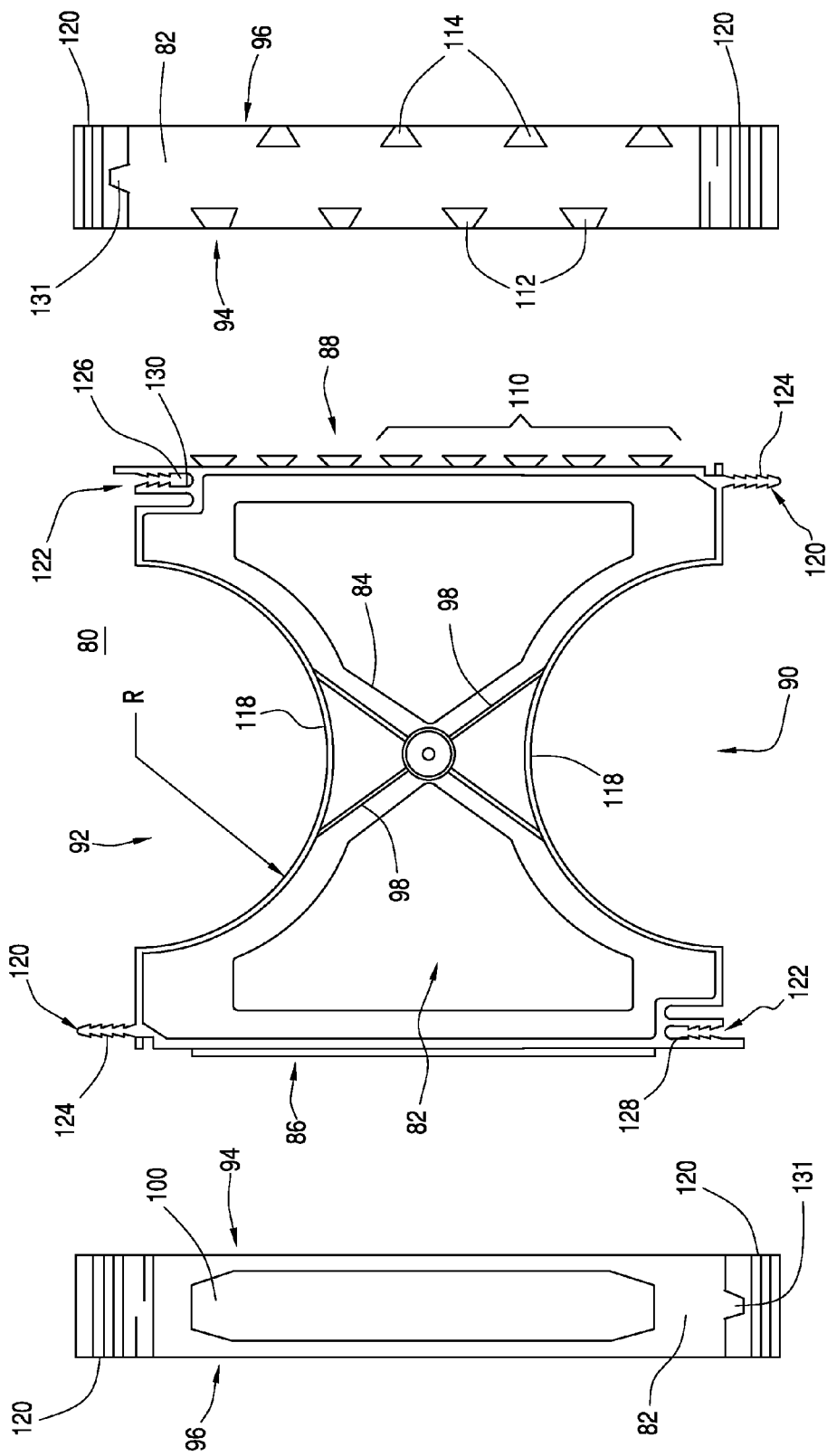

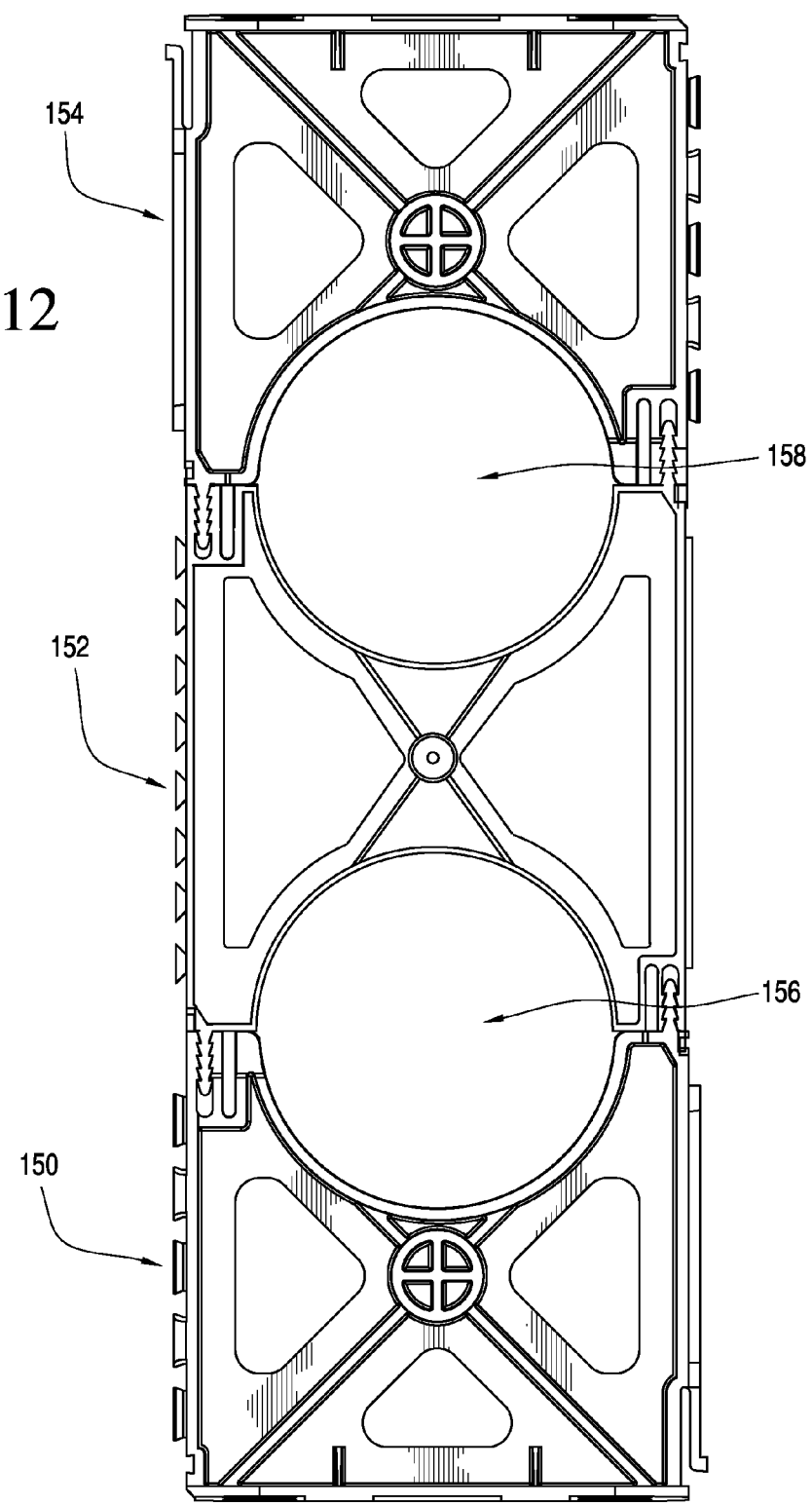

INTERCONNECTING ALIGNMENT AND SUPPORT SYSTEM WITH LATCHING MECHANISM

CROSS-REFERENCE TO RELATED APPLICATIONS

This application is a continuation of U.S. application Ser. No. 11/254,770, filed Oct. 21, 2005, now U.S. Pat. No. 7,828,251, which claims the benefit of U.S. Provisional Application No. 60/620,688, filed Oct. 22, 2004. Each patent application identified above is incorporated here by reference in its entirety to provide continuity of disclosure.

TECHNICAL FIELD

This invention relates generally to an alignment and support apparatus for aligning and supporting conduit and the like during a construction operation. More specifically, this invention relates to an interlocking and latching alignment and support apparatus that keeps conduit and the like supported and aligned during a concrete pour operation.

BACKGROUND

Many building structures, such as foundations, floors, ceilings, walls, and the like, include a concrete slab having conduit, pipes and the like embedded therein. Form boards are typically used to provide the desired shape of concrete slab. Concrete is poured into the form, and once set, the form is removed to reveal a concrete slab with conduit, pipes and the like embedded therein. It is very important that the conduits and/or pipes do not move during the concrete pouring operation so that the conduit or pipes remain in a known location according to the building plans.

For this reason, various apparatus and methods are employed in the construction art to support a desired configuration of pipes until the concrete (e.g. for a foundation) is poured and has had sufficient time to set or harden, thereby saving space by embedding the pipe work and the like in the concrete. Traditionally, for example, the outside bases of conduit spacers are fixed to the ground with, for example, rebar, with the remaining pieces of conduit not being attached. This allows the sections attached to the base section to move during concrete pouring which disassembles the horizontal connections.

For example, lengths of rebar are driven into the ground and sections of pipe are taped to the rebar to provide structural support to the conduit configuration. Because the rebar and tape are typically removed prior to the pouring of concrete so that footers may be dug, the conduits or pipes will often sag prior to the concrete pour operation, and unless repositioned will result in a plumbing or wiring configuration that is permanently crooked when later embedded in cured concrete.

Sagging or displacement often results in a poor pipe work configuration that causes pipe leaks, water pressure problems, and drainage issues all of which are best avoided by maintaining proper support and alignment of pipe work and the like both prior to and during a concrete pour operation. Sagging or displacement during pour often results in a poor or undesirable electrical conduit configuration, with conduit located incorrectly relative to building specifications. Other problems may result from displaced, incorrectly located, or sagging conduits and pipes.

SUMMARY

Thus, an exemplary aspect of this invention includes interlocks with latches that allow the assembly to act as one rigid body preventing the bank of components from moving and/or collapsing upon itself. Through the use of an easily latched and unlatched interlock mechanism, the spacers can be assembled and/or disassembled to provide a sturdy, rigid structure.

An exemplary aspect of the invention relates to a latch concept for conduit spacers. In particular, an exemplary embodiment of the invention relates to an integral latch that restricts the conduit spacers from moving vertically with respect to each other. If the conduit spacers do not include a vertically restraining latch, the conduit spacers could float during, for example, pouring of concrete.

The components illustrated herein can be scaled to any size as well as made from any material or combination of materials including, but not limited to, plastics, composites, metals, and alloys.

BRIEF DESCRIPTION OF DRAWINGS

FIG. 1 is a front elevation view of an exemplary embodiment of a base spacer in accordance with the present invention;

FIG. 2 is a side elevation view of a receiving interlock side of the base spacer of FIG. 1;

FIG. 3 is a side elevation view of a positive interlock side of the base spacer of FIG. 1;

FIG. 5 is a top view of the base spacer of FIG. 1;

FIG. 6 is an expanded partial view of the side interlock joint shown in FIG. 4 showing an exemplary interlock latching mechanism in detail;

FIG. 7 is a bottom view of the base spacer of FIG. 1;

FIG. 8 is a front elevation view of an exemplary embodiment of an intermediate spacer in accordance with the present invention;

FIG. 9 is a side elevation view of a positive interlock side of the intermediate spacer of FIG. 8;

FIG. 10 is a side elevation view of a receiving interlock side of the intermediate spacer of FIG. 8;

FIG. 12 is a front elevation view showing two base spacers interlocked on opposite ends of an intermediate spacer.

Like reference symbols in the various drawings indicate like elements.

DETAILED DESCRIPTION

Figure 4:
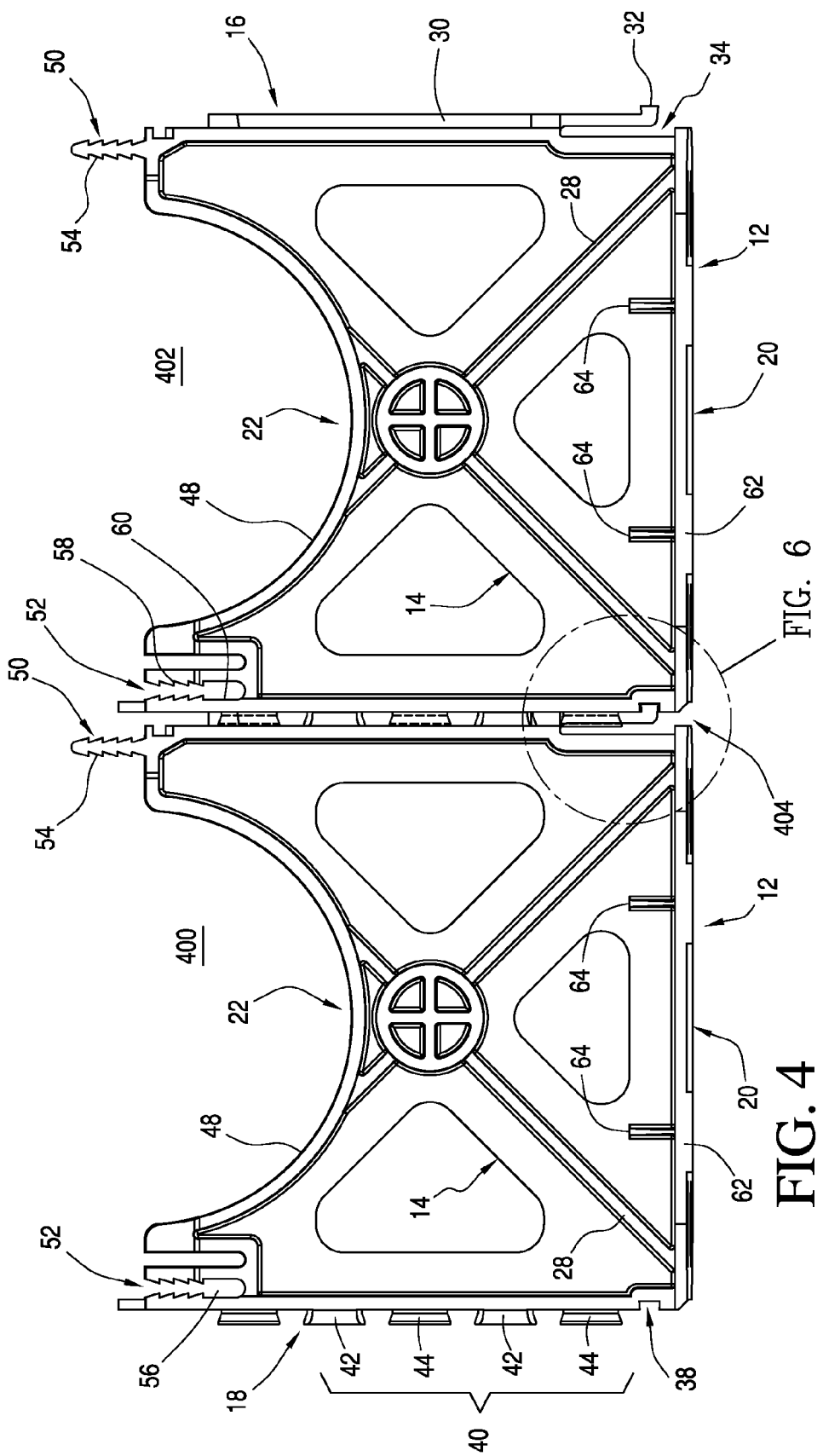
FIG. 4 is a front elevation view showing two exemplary base spacers that have been interlocked side-by-side with each other.

The terms "conduit" and "pipe" are used interchangeably in this specification. Further, it should be appreciated that the present invention may be used to support and align other elongate articles beyond conduits, pipes and the like. The terms "device", "apparatus", and "spacer" are used interchangeable herein.

The terms "top", "bottom", and "sides" are used in the specification to describe the various views of the figures. It should be appreciated that in actual use, an embodiment of the invention may be rotated either horizontally or vertically in order to assemble a support and alignment structure. And, as a result of such rotation, the descriptive terms may not literally apply to a particular construction. In other words, the various terms of "top", "bottom", "base" and the like are relative and are used here to describe the figures for illustration purposes and are not intended to limit the embodiments shown to any particular orientation.

Referring to FIG. 1, the exemplary base spacer 10 comprises a body 12 having a middle portion 14, a positive interlock side 16, a receiving interlock side 18, a bottom 20 and a top 22. The base spacer body 12 also has a front 24 and a back 26 (shown in FIGS. 2 and 3).

The middle portion 14 of the base spacer body 12 is disposed between the two sides (16 and 18) and the top 22 and bottom 20. The middle portion 14 may be formed as a solid member or as a member that is partially open. The middle portion 14 may optionally be formed with one or more stiffening ribs 28 that may increase the load bearing capacity of the base spacer 10 and may serve to reduce twisting or flexing by the base spacer 10.

Referring to FIGS. 1 and 3, the exemplary positive interlock side 16 includes a positive side projection 30 extending outwardly from the side of the base spacer body 12. The positive side projection 30 is adapted to slidably engage the receiving interlock side 18 of another base spacer. The positive side projection 30 is widest at the outermost side and tapers inwardly to become narrower nearest the base spacer body (this tapering can be best seen in FIG. 5, which is a lop view of the base spacer of FIG. 1). The positive side projection 30 is nearly the same height as the side of the base spacer. In an alternative exemplary embodiment, the positive side projection 30 comprises a plurality of vertically spaced segments, instead of a continuous single piece. The base spacer includes a latch member 32 disposed near the bottom of the positive interlock side 16 and extending outwardly at a substantially ninety degree angle from the positive interlock side 16. The latch member 32 may be integral with the positive side projection, or may be a separate member not integral with the positive side projection. Other latch member angles could be used.

The middle portion 14 of the base spacer body 12 is recessed slightly from the side and from the bottom of the positive side projection 30, and extending toward the top of the spacer to approximately one-quarter of the way up from the bottom of the positive side projection 30. This recess provides a gap 34 between the positive side projection 30 and the middle portion 14 of the base spacer body 12. The positive side projection 30 is also narrower over the gap 34 than at the rest of the projection, as can be seen in the positive side elevation view of FIG. 3 at the portion of the positive side projection 30 indicated by reference number 36.

Referring to FIG. 1, the gap 34 between the positive side projection 30 and the middle portion 14 of the base spacer 10 permits the positive side projection 30 to flex inwardly as the positive side projection 30 engages the receiving side 18 of another spacer. This inward flex accommodates the latch member 32 which extends outwardly. Once the base spacer 10 is fully interlocked side-by-side with another spacer, the latch member 32, under tension from being inwardly flexed, will extend outwardly into a recess 38 on the receiving side of the other spacer and form a latching mechanism between the two spacers. Two base spacers that have been interlocked side-by-side are shown in FIG. 4, described below.

Referring to FIGS. 1 and 2, the exemplary receiving side 18 of the base spacer includes a plurality of projections 40 for receiving and engaging the positive interlock side projection 30 of another base spacer. Together with the positive side projection 30, the plurality of receiving side projections 40 form a partially open dovetail-like interlocking joint when assembled. The plurality of receiving side projections 40 are disposed and distributed along the receiving side 18 from top to bottom. A number of the projections are disposed toward the front of the base spacer (42 in FIG. 2) and a number of the projections are disposed toward the rear of the base spacer (44 in FIG. 2). It should be appreciated that while a specific number of projections are illustrated, any number of projection(s) can be used.

Referring to FIG. 2, the front and rear projections (42 and 44) oppose each other to form a channel in which the positive side projection of another spacer (46, dashed line) can slide into engage. The front and rear receiving side projections (42 and 44) taper from narrow at the outside to wider on the inside near the base spacer body. This tapering gives the receiving side channel an opposite shape from the positive side projection and allows the positive side projection to engage and interlock with the receiving side of another base spacer. FIG. 2 shows the arrangement of receiving side projections on the base spacer of FIG. 1. A positive side projection is shown in FIG. 2 by a dashed line and indicates where a positive side projection would be located when fully interlocked and in place.

Two base spacers are engaged in a top to bottom, or opposed interlocking manner when the positive side projection is slid in place and is fully interlocked when the latch 32 of the positive side projection 30 reaches the bottom of the receiving side 18 and engages the recess 38 provided thereon. Again, a fully interlocked and latched arrangement of two base spacers is shown in FIG. 4. The latching mechanism is shown in greater detail in FIG. 6.

Referring to FIG. 1, the top 22 of the base spacer 10 includes a conduit recess 48 for receiving a conduit, pipe or in general any elongate article and/or the recessed portion may be left empty. For example, the conduit recess 48 may be formed as a concave semicircle such that a conduit may be placed on top of the base spacer and will rest in the recess. The conduit recess 48 may be formed having a different size or radius depending on the contemplated use of the invention and the size of the conduit or pipe to be aligned and supported. Further, the conduit recess 48 may be formed having a shape to conform to a cross-sectional shape of a conduit, pipe or other elongate article that has a cross-sectional shape other than semicircular. In an exemplary embodiment not shown, a plurality of recesses could be formed permitting a single spacer to support multiple conduits.

Still referring to FIG. 1, the top 22 of the exemplary base spacer 10 includes two vertical interlock members each disposed on the top of the base spacer near a side. A positive vertical interlock member 50 is disposed on the top near the positive interlock side 16 and extends in an upward vertical direction from the base spacer body 12, the positive vertical interlock member 50 for inserting and interlocking with a receiving vertical interlock member 52 of another base spacer. The positive vertical interlock member 50 includes a series of angled protrusions 54 on each side.

A receiving vertical interlock member 52 is disposed on the top near the receiving interlock side 18 and includes a recess 56 extending in a downward vertical direction into the base spacer body 12, the recess 56 for receiving a positive vertical interlock member 50 of another base spacer. The recess 56 is lined on each side with a series of angled protrusions 58, followed a section 60 having no angled protrusions. The receiving vertical interlock member includes a tab 61 extending away from the recess 56.

Figure 11:
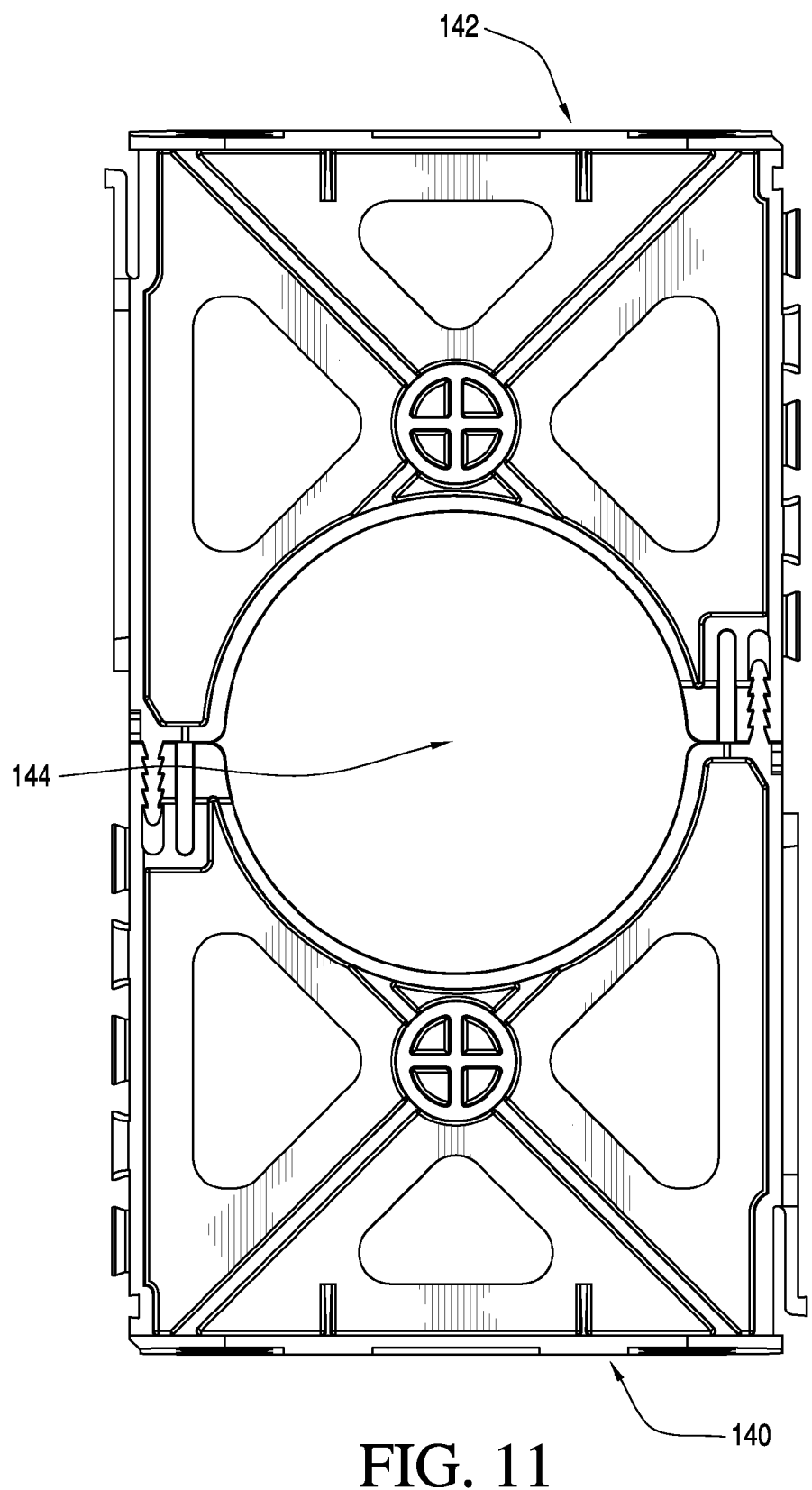
FIG. 11 is a front elevation view showing two base spacers interlocked in an opposing arrangement.

When two base spacers are interlocked in a vertically opposed manner, with one base spacer on the bottom and one base spacer on the top (as shown in FIG. 11), the two spacers are oriented such that the positive vertical interlock member 50 of the bottom base spacer is aligned with the receiving vertical interlock member 52 of the top base spacer. And, the receiving vertical interlock member 52 of the bottom base spacer is aligned with the positive vertical interlock member 50 of the top base spacer.

As mentioned above, both the receiving and the positive vertical interlock members (52 and 50) include a series of angled protrusions (58 and 54) extending from both side surfaces of both interlock members. These angled protrusions (58 and 54) create an interlocking and latching mechanism when a positive vertical interlock member 50 is inserted into a receiving vertical interlock member 52. As a positive vertical interlock member 50 is inserted into a receiving vertical interlock member 52, each angled protrusion engages and interlocks with a next angled protrusion, until, when fully assembled, each angled protrusion has engaged and interlocked with an angled protrusion on an opposing vertical interlock member, as shown in FIG. 11. The vertical interlocks are easily releasable by inserting a screwdriver, or other suitably thin instrument into the recess 56 and opening the receiving vertical interlock enough so that the angled protrusions on the positive vertical interlock member and the receiving vertical interlock member disengage, thus permitting the vertical interlock members to be released from each other.

Referring to FIGS. 2 and 3, the bottom of the exemplary base spacer body includes a support member 62 that extends from the front 24 and back 26 of the base spacer body 12 in a plane perpendicular to the front 24 and back 26 of the base spacer body 12. The support member 62 forms a stabilizing platform such that the base spacer 10 may be placed on a flat, level surface and stand upright without being supported by any other apparatus. The support member 62 optionally includes one or more reinforcing ribs 64 disposed on each side and joining the support member 62 and the base spacer body 12. The reinforcing ribs 64 are adapted to strengthen and stabilize the support member 62 relative to the base space body 12. The support member 62 may optionally include holes (shown in FIG. 7) extending from a top surface of the support member to a bottom surface of the support member. The holes may be adapted and constructed to allow a fastener to be inserted through the support member 62 and into an underlying surface, such that the base spacer 10 may be secured in place during a construction operation. Even without holes in the support member 62, a piercing fastener, such as a nail may be used to affix the support member 62 to an underlying surface. The support member 62 may be narrower in a middle portion and wider at the sides, as shown in FIG. 7. When a plurality of base spacers, each having holes in their respective support members, is interlocked it may be advantageous to use fasteners in only some of the holes to attach the base spacers to an underlying surface. Because the base spacers are interlocked and latched, the base spacers which do not have fasteners will still remain in place.

FIG. 4 is a front elevation view showing two exemplary base spacers that have been interlocked side-by-side with each other. Specifically, a first base spacer 400 is interlocked in a side-by-side manner with a second base spacer 402. Two base spacers are interlocked by sliding the sides together to engage the positive side projection of one base spacer with a receiving side projection of another base spacer. The latching mechanism 404 is shown in greater detail in FIG. 6 and described below. The latching mechanism is easily releasable by inserting a screwdriver, or other thin instrument, between the positive side projection 30 and the receiving interlock side 18, at a point near the latch member 32 and moving the latch member toward the recess 34 to disengage the latch member 32 from the recess 38.

FIG. 5 is a top view of the exemplary base spacer of FIG. 1. In particular, an exemplary support member 62 extends from the front 24 and back 26 of the base spacer body 12 in a plane perpendicular to the front 24 and back 26 of the base spacer body 12.

FIG. 6 is an expanded partial view of the side interlock joint shown in FIG. 4 showing an exemplary interlock latching mechanism in detail. It can be better seen in FIG. 6 how the latch member 32 of the positive side projection 30 engages the recess 38 on the receiving side 18. The positive side projection 30 slidably engages the receiving side projections 40 to create a partially open dovetail-like joint.

FIG. 7 is a bottom view of the exemplary base spacer of FIG. 1. In particular, an exemplary embodiment of a support member 62 includes holes 702 for inserting fasteners through the support member 62 and into an underlying surface. The support member 62 also includes a middle portion 704 that is narrower than the two end portions.

FIG. 8 is a front elevation view of an exemplary embodiment of an intermediate spacer in accordance with the present invention. In particular, an intermediate spacer 80 comprises a body 82 having a middle portion 84, a positive interlock side 86, a receiving interlock side 88, a bottom 90 and a top 92. The intermediate spacer body 82 also has a front 94 and a back 96 (shown in FIGS. 9 and 10).

The middle portion 84 of the intermediate spacer body 82 is disposed between the two sides (86 and 88) and the top 92 and bottom 90. The middle portion 84 may be formed as a solid member or as a member that is partially open. The middle portion 84 may optionally be formed with one or more stiffening ribs 98 that may increase the load bearing capacity of the intermediate spacer 80 and may serve to reduce twisting or flexing by the intermediate spacer 80.

Referring to FIGS. 8 and 9, the exemplary positive interlock side 86 includes a positive side projection 100 extending outwardly from the side of the intermediate spacer body 82. The positive side projection 100 is adapted to slidably engage the receiving interlock side 98 of another intermediate spacer. The positive side projection 100 is widest at the outermost side and tapers inwardly to become narrower nearest the base spacer body (this tapering is similar to that shown for the positive side projection 30 in FIG. 5, which is a top view of the base spacer of FIG. 1). The positive side projection 100 is nearly the same height as the side of the intermediate spacer and is optionally tapered at each end.

Referring to FIGS. 8 and 10, the exemplary receiving side 88 of the intermediate spacer includes a plurality of projections 110 for receiving and engaging the positive interlock side projection 1000 of another intermediate spacer. Together with the positive side projection 100, the plurality of receiving side projections 110 form a partially open dovetail-like interlocking joint when assembled. The plurality of receiving side projections 110 are disposed and distributed along the receiving side 88 from top to bottom. A number of the projections are disposed toward the front of the base spacer (112 in FIG. 10) and a number of the projections are disposed toward the rear of the base spacer (114 in FIG. 10). It should be appreciated that while a specific number of projections are illustrated, any number of projection(s) can be used.

Referring to FIG. 10, the front and rear projections (112 and 114) oppose each other to form a channel in which the positive side projection 100 of another spacer can slide in to engage the receiving side 88. The front and rear receiving side projections (112 and 114) taper from narrow at the outside to wider on the inside near the intermediate spacer body. This tapering gives the receiving side channel an opposite shape from the positive side projection and allows the positive side projection to engage and interlock with the receiving side of another intermediate spacer. FIG. 10 shows the arrangement of receiving side projections on the intermediate spacer of FIG. 8.

Referring to FIG. 8, the top 92 and bottom 90 of the intermediate spacer 80 includes conduit recesses 118, each having a radius R, for receiving a conduit, pipe or in general any elongate article and/or the recessed portions may be left empty. For example, the conduit recesses 118 may be formed as a concave semicircle such that a conduit may be placed on top and bottom of the intermediate spacer and will rest in the recesses. The conduit recesses 118 may be formed having a different size or radius depending on the contemplated use of the invention and the size of the conduit or pipe to be aligned and supported. Further, the conduit recesses 118 may be found having a shape to conform to a cross-sectional shape of a conduit, pipe or other elongate article that has a cross-sectional shape other than semicircular. In an exemplary embodiment not shown, a plurality of recesses could be formed permitting a single spacer to support multiple conduits.

Still referring to FIG. 8, the top 92 and bottom 90 of the exemplary intermediate spacer 80 includes two vertical interlock members disposed on each of the top and bottom of the intermediate spacer near a side. A positive vertical interlock member 120 is disposed on the top near the positive interlock side 86 and extends in an upward vertical direction from the intermediate spacer body 82. Another positive vertical interlock member 120 is disposed on the bottom near the receiving interlock side 88 and extends in an downward vertical direction from the intermediate spacer body 82. The positive vertical interlock members 120 for inserting and interlocking with receiving vertical interlock members 122 of other spacers. The positive vertical interlock member 120 includes a series of angled protrusions 124 on each side.

A receiving vertical interlock member 122 is disposed on the top near the receiving interlock side 88 and includes a recess 126 extending in a downward vertical direction into the intermediate spacer body 82, the recess 126 for receiving a positive vertical interlock member 120 of another spacer. Another receiving vertical interlock member 122 is disposed on the bottom near the positive interlock side 86 and includes a recess 126 extending in a upward vertical direction into the intermediate spacer body 82, the recess 126 for receiving a positive vertical interlock member 120 of another spacer. The recesses 126 are lined on each side with a series of angled protrusions 128, followed a section 130 having no angled protrusions. The receiving vertical interlock member 122 also includes a tab 131 extending away from the recess 126.

When two intermediate spacers are interlocked in a vertically opposed manner with another intermediate spacer or a base spacer, for example, with one base spacer on the bottom and one base spacer on the top (as shown in FIG. 12), the two spacers are oriented such that the positive vertical interlock member 120 of one intermediate spacer is aligned with the receiving vertical interlock member 122 of another intermediate spacer (or the receiving vertical interlock member 52 of a base spacer). And, the receiving vertical interlock member 122 of one intermediate spacer is aligned with the positive vertical interlock member 120 of another intermediate spacer (or the positive vertical interlock member 50 of a base spacer).

As mentioned above, both the receiving and the positive vertical interlock members (122 and 120) include a series of angled protrusions (128 and 124) extending from both side surfaces of both interlock members. These angled protrusions (128 and 124) create an interlocking and latching mechanism when a positive vertical interlock member 120 is inserted into a receiving vertical interlock member 122. As a positive vertical interlock member 120 is inserted into a receiving vertical interlock member 122, each angled protrusion engages and interlocks with a next angled protrusion, until, when fully assembled, each angled protrusion has engaged and interlocked with an angled protrusion on an opposing vertical interlock member, as shown in FIG. 12. The vertical interlocks are easily releasable by inserting a screwdriver, or other suitably thin instrument into the recess 126 and opening the receiving vertical interlock enough so that the angled protrusions on the positive vertical interlock member and the receiving vertical interlock member disengage, thus permitting the vertical interlock members to be released from each other.

FIG. 11 is a front elevation view showing two base spacers interlocked in an opposing arrangement. In particular, a first base spacer 140 is interlocked in a vertically opposed arrangement with another base spacer 142. The description of the vertical interlocks may be found above in the description of FIG. 1. A circular conduit support and alignment opening 144 is created by the interlocked base spacers.

FIG. 12 is a front elevation view showing two base spacers interlocked on opposite ends of an intermediate spacer. In particular, a first base spacer 150 is vertically interlocked with an intermediate spacer 152, which is in turn vertically interlocked with another base spacer 154. This configuration of an intermediate spacer and two base spacers creates a first conduit opening 156 and a second conduit opening 158.

It should be appreciated that base spacers and intermediate spacers of the present invention may be arranged in various configurations according to a contemplated uses of the invention.

Base spacers and/or intermediate spacers of the present invention can be made of any suitable material such as a plastic, metal, alone or in combination, or formed of a composite material. For example, the spacers shown in FIGS. 1 and 8 can be made of molded plastic in one piece by an injection molding process. Alternatively, the spacers may be individually made of a metal such as lightweight aluminum, copper or steel, or made of, for example, ABS plastic (ABS, acrylonitrile-butadiene-styrene) or PVC (polyvinylchloride), or other plastic. If made of metal, the spacers may be formed by pressing, stamping, casting, or other technique suitable to form spacers in accordance with the present invention. If made of metal, the spacers may be covered in a suitable coating to prevent unwanted interactions between the spacers and metal pipes or conduits made of a dissimilar metal. Alternatively, the spacers may be made principally of a metal but with some parts made of plastic. Suitable plastics include (but are not limited to): reinforced molded plastic, PVC and ABS, for example.

As is apparent from the above description and the figures referenced therein, there is provided an interconnecting alignment and support system with latching mechanism in accordance with the present invention. While this invention has been described in conjunction with a number of embodiments, it is evident that many alternatives, modifications and variations would be, or are, apparent to those of ordinary skill in the applicable arts. Accordingly, applicant intends to embrace all such alternatives, modifications, equivalents and variations that are within the spirit and scope of this invention.

The invention claimed is:

1. An alignment and support apparatus for elongate articles comprising:
   a first base spacer including a body having:
      a front and a back;
      a top comprising at least one recess for supporting an elongate article;

a bottom comprising a support member extending from the body in a plane perpendicular to the front and back;

a positive interlock side including a positive side projection extending along a major portion of the positive interlock side between the top and bottom of the base spacer body;

a receiving interlock side including a plurality of receiving interlock projections;

a latch member disposed on the positive interlock side and depending directly from the positive side projection proximal the bottom of the first base spacer body;

a recess for receiving another latch member, the recess disposed on the receiving interlock side opposite the first base spacer latch member;

a middle portion, the middle portion being disposed between the top and bottom and between the positive interlock side and the receiving interlock side; and a recessed portion proximal the bottom and positive interlock side of the first base spacer body, wherein the recessed portion forms a gap disposed between the latch member and the first base spacer body, the gap being configured to allow a portion of the positive side projection and the latch member to flex toward the first base spacer body when the positive side projection engages a receiving interlock side of another base spacer, and wherein the gap is maintained when the first base spacer is interlocked side-by-side with a second base spacer having the same configuration.

2. The alignment and support apparatus of claim 1, further comprising a positive vertical interlock member disposed on the top of the base spacer body near the positive interlock side, and a receiving vertical interlock member disposed on the top of the base spacer body near the receiving interlock side.

3. The alignment and support apparatus of claim 2, wherein the receiving vertical interlock member includes a recess extending into the first base spacer body and further includes a tab portion proximal an open end of the recess and extending beyond the top of the first base spacer body.

4. The alignment and support apparatus of claim 2, further comprising a second base spacer including a body having:
 a front and a back;
 a top having at least one recess for supporting an elongate article;
 a bottom having a support member extending from the body in a plane perpendicular to the front and back;
 a positive interlock side having a positive side projection;
 a receiving interlock side having a plurality of receiving interlock projections;
 a latch member disposed on the positive interlock side;
 a recess for receiving another latch member, the recess disposed on the receiving interlock side opposite the first base spacer latch member; and
 a middle portion, the middle portion being disposed between the top and bottom and between the positive interlock side and the receiving interlock side, the second base spacer body including a gap disposed between the latch member and the second base spacer body;
 a positive vertical interlock member disposed on the top near the positive interlock side, and a receiving vertical interlock member disposed on the top near the receiving interlock side.

5. The alignment and support apparatus of claim 4, wherein the second base spacer positive side projection is adapted to interlock with the first base spacer plurality of receiving interlock projections.

6. The alignment and support apparatus of claim 4, wherein the second base spacer positive vertical interlock is adapted to interlock with the first base spacer receiving vertical interlock and the first base spacer positive vertical interlock is adapted to interlock with the second base spacer receiving vertical interlock.

7. The alignment and support apparatus of claim 1, wherein the positive side projection includes a portion proximal the latch member that is substantially narrower than a majority of the positive side projection.

8. The alignment and support apparatus of claim 2, further comprising an intermediate spacer including a body having:
 a top having at least one recess for supporting an elongate article;
 a bottom having at least one recess for supporting an elongate article;
 a positive interlock side having a positive side projection;
 a receiving interlock side having a plurality of receiving interlock projections;
 a middle portion, the middle portion being disposed between the top and bottom and between the positive interlock side and the receiving interlock side.

9. The alignment and support apparatus of claim 8, further comprising a positive vertical interlock member disposed on the top of the intermediate spacer body near the positive interlock side, and a receiving vertical interlock member disposed on the top of the intermediate spacer body near the receiving interlock side, wherein the positive vertical interlock member and receiving vertical interlock member are adapted to interlock with complementary vertical interlock members of another intermediate spacer or a base spacer.

10. A method of supporting and aligning elongate articles comprising:
 providing a first base spacer and a second base spacer each including a body having a front and a back, a top comprising at least one recess for supporting an elongate article, a bottom comprising a support member extending from the body in a plane perpendicular to the front and back, a positive interlock side including a positive side projection, a receiving interlock side including a plurality of receiving interlock projections, a middle portion, the middle portion being disposed between the top and bottom and between the positive interlock side and the receiving interlock side, a positive vertical interlock member disposed on the top of the base spacer body near the positive interlock side, and a receiving vertical interlock member disposed on the top of the base spacer body near the receiving interlock side, the receiving vertical interlock member having a recess extending into the first base spacer body and further having a tab portion proximal an open end of the recess and extending from the receiving interlock side beyond the top of the first base spacer body, the tab portion having a major surface that is substantially coplanar with the receiving interlock side, the major surface having a width that is narrower than a width of the receiving interlock side;
 positioning an elongate article on the first base spacer recess; and
 interlocking the second base spacer in a vertically opposed configuration such that the positive and receiving vertical interlock members of the first base spacer interlock with complementary vertical interlock members of the second base spacer.

11. The method of claim 10, further comprising unlocking the first base spacer from the second base spacer by releasing the positive vertical interlock members from the receiving vertical interlock members.

12. The method of claim 10, further comprising:
providing a third base spacer including a body having a front and a back, a top comprising at least one recess for supporting an elongate article, a bottom comprising a support member extending from the body in a plane perpendicular to the front and back, a positive interlock side including a positive side projection, a receiving interlock side including a plurality of receiving interlock projections, a middle portion, the middle portion being disposed between the top and bottom and between the positive interlock side and the receiving interlock side, a positive vertical interlock member disposed on the top of the base spacer body near the positive interlock side, and a receiving vertical interlock member disposed on the top of the base spacer body near the receiving interlock side; and
interlocking the third base spacer with the first base spacer by engaging the third base spacer positive side projection with the first base spacer plurality of receiving interlock projections.

13. The method of claim 12, further comprising unlocking the first base spacer from the third base spacer by releasing the third base spacer positive side projection from the first base spacer plurality of receiving interlock projections.

14. An alignment and support apparatus for elongate articles comprising:
means for supporting an elongate article;
means for supporting the apparatus; and
means for interlocking sides of the apparatus with another apparatus,
wherein the interlocking means comprises a single positive side projection having a substantially uniform width and disposed on a positive interlocking side of the apparatus, and a corresponding plurality of receiving side projections disposed on a receiving interlocking side of the apparatus, a first number of the plurality of receiving side projections being disposed along a first edge of the receiving interlocking side proximal a front side of the apparatus and a second number of the plurality of receiving side projections being disposed along a second edge of the receiving interlocking side proximal a back side of the apparatus, the first number and second number of the plurality of receiving side projections opposing each other to form a single channel, the channel being disposed between the first and second number of the plurality of receiving side projections and substantially parallel to the first and second edge of the receiving interlocking side,
wherein an endmost portion of the single positive side projection proximal a bottom of the apparatus has a width that is substantially narrower than a width of a remaining portion of the positive side projection.

15. The alignment and support apparatus of claim 14, further comprising means for vertically interlocking with another apparatus.

16. The alignment and support apparatus of claim 14, further comprising means for vertically interlocking with an intermediate spacer.

17. The alignment and support apparatus of claim 14, wherein the positive side projection is substantially the same height as the positive interlocking side of the apparatus.

18. The alignment and support apparatus of claim 14, further comprising means for latching interlocked sides.

19. The alignment and support apparatus of claim 14, further comprising means for attaching the apparatus to an underlying surface.

20. The alignment and support apparatus of claim 18, further comprising an intermediate spacer including:
a top having means for supporting an elongate article;
a bottom having means for supporting an elongate article;
a positive interlock side having means for side interlocking;
a receiving interlock side having means for side interlocking; and
means for vertical interlocking disposed on each of the top and bottom.

* * * * *